(12) United States Patent
Rexhepi et al.

(10) Patent No.: US 8,077,680 B2
(45) Date of Patent: Dec. 13, 2011

(54) PACKET-SWITCHED HANDOVER

(75) Inventors: Vlora Rexhepi, Espoo (FI); Guillaume Sebire, Helsinki (FI); Shkumbin Hamiti, Helsinki (FI); Janne Parantainen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 345 days.

(21) Appl. No.: 10/571,892

(22) PCT Filed: Aug. 25, 2004

(86) PCT No.: PCT/FI2004/000497
§ 371 (c)(1),
(2), (4) Date: Aug. 23, 2006

(87) PCT Pub. No.: WO2005/027561
PCT Pub. Date: Mar. 24, 2005

(65) Prior Publication Data
US 2006/0291416 A1 Dec. 28, 2006

(30) Foreign Application Priority Data
Sep. 15, 2003 (FI) .................................... 20031318

(51) Int. Cl.
*H04B 7/216* (2006.01)
(52) U.S. Cl. .................. 370/335; 370/331; 370/328
(58) Field of Classification Search .................. 370/335, 370/331, 339, 329
See application file for complete search history.

(56) References Cited

U.S. PATENT DOCUMENTS

| 2002/0064144 A1* | 5/2002 | Einola et al. | 370/335 |
| 2003/0104816 A1* | 6/2003 | Duplessis et al. | 455/448 |
| 2004/0120286 A1* | 6/2004 | Schwarz | 370/331 |

FOREIGN PATENT DOCUMENTS

| WO | WO 99/34635 | 7/1999 |
| WO | WO 00/79808 | 12/2000 |
| WO | WO 01/30107 | 4/2001 |
| WO | WO 01/39525 A2 | 5/2001 |

* cited by examiner

*Primary Examiner* — Phuoc Doan
(74) *Attorney, Agent, or Firm* — Squire, Sanders & Dempsey (US) LLP

(57) ABSTRACT

A packet-switched handover from a first cell to a second cell in a cellular network is discussed. Packet-switched services are provided for a mobile station in the first cell based on a set of information relating to provision of packet-switched services and a protocol for handling provision of packet-switched services for mobile stations, said protocol being a protocol between a cell and a respective control network element. In a control network element relating to the first cell a first message is received, which indicates a request for a packet-switched handover for a mobile station. In response to said first message, a second message is sent to the second cell. This second message requests creation of a set of information relating to provision of packet-switched services for the mobile station in the second cell, and the second message belongs to said protocol for handling provision of packet-switched services for mobile stations.

30 Claims, 14 Drawing Sheets

Table 15: TLLI structure (3GPP 23.003)

| 31 | 30 | 29 | 28 | 27 | 26 to 0 | Type of TLLI |
|---|---|---|---|---|---|---|
| 1 | 1 | T | T | T | T | Local TLLI |
| 1 | 0 | T | T | T | T | Foreign TLLI |
| 0 | 1 | 1 | 1 | 1 | R | Random TLLI |
| 0 | 1 | 1 | 1 | 0 | A | Auxiliary TLLI |
| 0 | 1 | 1 | 0 | X | X | Reserved |
| 0 | 1 | 0 | X | X | X | Reserved |
| 0 | 0 | 0 | 0 | G | G | Part of the assigned G-RNTI |
| 0 | 0 | 0 | 1 | R | R | Random G-RNTI |
| 0 | 0 | 1 | H | H | H | Handover TLLI |

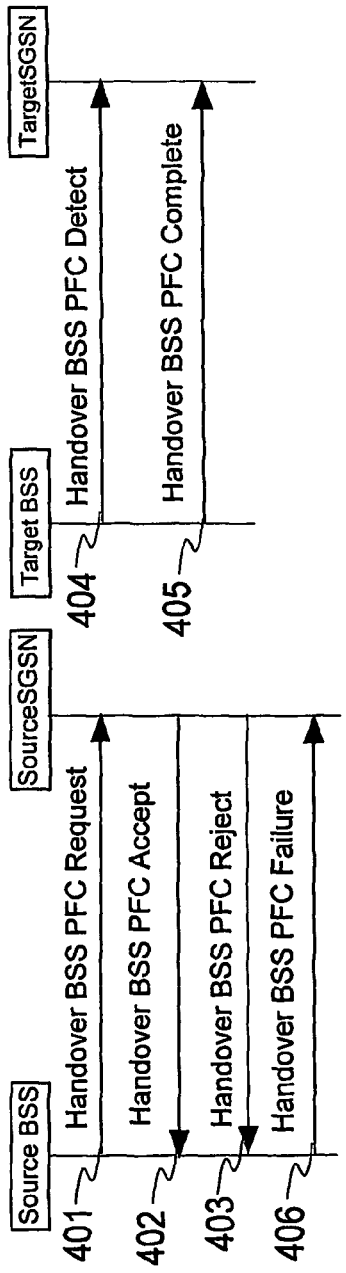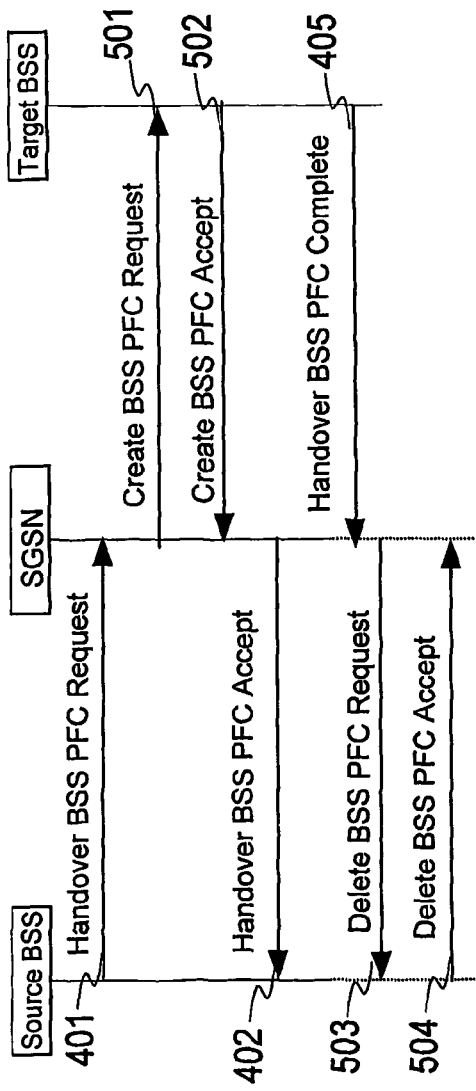
Fig. 4
Fig. 5

Table 1: Handover-BSS-PFC PDU

| Information elements | Type / Reference | Presence | Format | Length |
|---|---|---|---|---|
| PDU type | PDU type | M | V | 1 |
| TLLI | TLLI/ (local TLLI) | M | TLV | 6 |
| IMSI | IMSI/ | O | TLV | 5-10 |
| PFI | PFI/ list of PFIs | M | TLV | 3-? |
| PFT | GPRS Timer/ | M | TLV | 3 |
| SourceCell ID | Source Cell identifier | M | | |
| TargetCell ID | Target Cell Identfier | M | | |
| TBF handover Source Cell Container | TBF parameters in the source cell: TBF mode, RLC mode, | M | | |
| Routing and Location related IE | BVCI, BSS Area Indication, Location Area, Routing Area | O | | |
| Service UTRAN CCO | Service UTRAN CCO / | O | TLV | 3 |

Fig. 6a

Table 3: Handover-BSS-PFC-Nack PDU

| Information elements | Type / Reference | Presence | Format | Length |
|---|---|---|---|---|
| PDU type | PDU type | M | V | 1 |
| TLLI | TLLI/ local TLLI or handover TLLI | M | TLV | 6 |
| IMSI | IMSI/ | O | TLV | 5-10 |
| PFI | PFI/ list of PFIs | M | TLV | 3 |
| PFT | GPRS Timer | M | TLV | 3 |
| SourceCell ID | Source Cell identifier | M | | |
| TargetCell ID | Target Cell Identfier | M | | |
| TBFHandover reference | TBFHandover_ref | O | | |
| Cause | Rejected or Failure | M | | |
| Service UTRAN CCO | Service UTRAN CCO /11.3.47. | O | TLV | 3 |

Fig. 6c

Table 2: Handover-BSS-PFC-Ack PDU

| Information elements | Type / Reference | Presence | Format | Length |
|---|---|---|---|---|
| PDU type | PDU type | M | V | 1 |
| TLLI | TLLI/ (handover) TLLI | M | TLV | 6 |
| IMSI | IMSI/ | O | TLV | 5–10 |
| PFI | PFI/ list of accepted PFIs | M | TLV | 3 |
| PFT | GPRS Timer/ | M | TLV | 3 |
| SourceCell ID | Source Cell identifier | M | | |
| TargetCell ID | Target Cell Identfier | M | | |
| TBF handover Target Cell Container | UL TBF parameters: -MAC parameters: PDCH mapping, TFI, USF -RLC parameters: channel coding, RLC reset, DL TBF parameters: -MAC parameters: PDCH mapping, TFI, -RLC parameters: RLC reset, Target Cell Frequency parameters; PSI instances; a set of instances from the PSI: GPRS cell options; access bursts type (8 or 11-bits), (still TBD) | M | | |
| TBFHandover reference | TBFHandover_ref | O | | |
| Routing and Location related IE | BVCI, BSS Area Indication, Location Area, Routing Area | O | | |
| Service UTRAN CCO | Service UTRAN CCO /11.3.47. | O | TLV | 3 |

Fig. 6b

Table 4: Handover-BSS-PFC-Detect PDU

| Information elements | Type / Reference | Presence | Format | Length |
|---|---|---|---|---|
| PDU type | PDU type | M | V | 1 |
| TLLI | TLLI/ handover TLLI | M | TLV | 6 |
| TBFHandover reference | TBFHandover_ref | O | | |

Fig. 6d

Table 5: Handover-BSS-PFC-Completed PDU

| Information elements | Type / Reference | Presence | Format | Length |
|---|---|---|---|---|
| PDU type | PDU type | M | V | 1 |
| PFI | PFI/ list of PFIs | M | TLV | 3 |
| TLLI | TLLI/ handover TLLI | M | TLV | 6 |
| TBFHandover reference | TBFHandover_ref | O | | |

Fig. 6e

Table 6: Handover-BSS-PFC-Failure PDU

| Information elements | Type / Reference | Presence | Format | Length |
|---|---|---|---|---|
| PDU type | PDU type | M | V | 1 |
| TLLI | TLLI/ | M | TLV | 6 |
| PFI | PFI/ list of PFIs | M | TLV | 3 |
| Cause | NoResources/ AccessFailure | M | | |
| TBFHandover reference | TBFHandover_ref | O | | |

Fig. 6f

Table 7: Handover SGSN BSS PFC Request

| Information element | Presence | Reference |
|---|---|---|
| IMSI | M | 7.7.2[TS29.060] |
| P-TMSI (old) | M | |
| Tunnel Endpoint Identifier Control Plane | M | 7.7.14[TS29.060] |
| Charging Characteristics | O | 7.7.23[TS29.060] |
| MM Context | M | 7.7.28[TS29.060] |
| PDP Context (for the PFI list) | C | 7.7.29[TS29.060] |
| SGSN Address for Control plane | M | 7.7.32[TS29.060] |
| Source Cell identifier | M | [TS24.008] |
| Target Cell Identifier | M | [TS24.008] |
| TBF handover Source Cell Container | M | |
| SNDCP XID parameters | M | [TR-GP030232] |
| LLC XID parameters | M | [TR-GP030232] |
| SAPIs | M | [TR-GP030232] |
| NSAPIs | M | [TR-GP030232] |
| Routing and Location related IE | O | |
| PDP Context Prioritization | O | 7.7.45[TS29.060] |
| Private Extension | O | 7.7.46[TS29.060] |

Fig. 9a

Table 8: Handover SGSN BSS PFC Accept

| Information element | Presence | Reference |
|---|---|---|
| IMSI | M | 7.7.2 [TS29.060] |
| Tunnel Endpoint Identifier Control Plane | C | 7.7.14[TS29.060] |
| SGSN Address for Control plane | C | 7.7.32[TS29.060] |
| TBF handover Target Cell Container | M | |
| PFI/ list of accepted PFIs | M | [TS08.18] |
| TBFHandover reference | O | |
| Routing and Location related IE | O | |
| Private Extension | O | 7.7.46[TS29.060] |
| SGSN Number | O | 7.7.47[TS29.060] |

Fig. 9b

Table 9: Handover SGSN BSS PFC Reject

| Information element | Presence | Reference |
|---|---|---|
| IMSI | M | 7.7.2 [TS29.060] |
| TBFHandover reference | O | |
| Routing and Location related IE | O | |
| Private Extension | O | 7.7.46[TS29.060] |
| Cause | M | |

Fig. 9c

Table 10: Handover SGSN BSS PFC Complete

| Information element | Presence | Reference |
|---|---|---|
| IMSI | M | 7.7.2 [TS29.060] |
| TLLI (handover TLLI) | O | |
| TBFHandover reference | O | |
| Routing and Location related IE | O | |
| Private Extension | O | 7.7.46[TS29.060] |

Fig. 9d

Table 11: Handover SGSN BSS PFC Failure

| Information element | Presence | Reference |
|---|---|---|
| IMSI | M | 7.7.2 [TS29.060] |
| TLLI (handover TLLI) | O | [TS24.008] |
| TBFHandover reference | O | |
| Private Extension | O | 7.7.46[TS29.060] |
| Cause | M | |

Fig. 9e

Table 12: Create-BSS-PFC PDU

| Information elements | Type / Reference | Presence | Format | Length |
|---|---|---|---|---|
| PDU type | PDU type/11.3.26 | M | V | 1 |
| TLLI | TLLI/ handover TLLI | M | TLV | 6 |
| IMSI | IMSI/11.3.14 | O | TLV | 5-10 |
| PFI | PFI/list of PFIs | M | TLV | 3 |
| PFT | GPRS Timer/11.3.44 | M | TLV | 3 |
| ABQP | ABQP/11.3.43 | M | TLV | 3-? |
| Service UTRAN CCO | Service UTRAN CCO /11.3.47. | O | TLV | 3 |
| SourceCell ID | Source Cell identifier | M | | |
| TargetCell ID | Target Cell Identfier | M | | |
| TBF handover Source Cell Container | TBF parameters in the source cell: TBF mode, RLC mode, | M | | |

Fig. 10a

Table 14: Create-BSS-PFC-Nack PDU

| Information elements | Type / Reference | Presence | Format | Length |
|---|---|---|---|---|
| PDU type | PDU type/11.3.26 | M | V | 1 |
| TLLI | TLLI/handover TLLI | M | TLV | 6 |
| PFI | PFI/list of PFIs | M | TLV | 3 |
| Cause | Cause/ no resources-reject | M | TLV | 3 |

Fig. 10c

Table 13: Create-BSS-PFC-ACK PDU content

| Information elements | Type / Reference | Presence | Format | Length |
|---|---|---|---|---|
| PDU type | PDU type/11.3.26 | M | V | 1 |
| TLLI | TLLI/(handover TLLI) | M | TLV | 6 |
| PFI | PFI/list of accepted PFIs | M | TLV | 3 |
| ABQP | ABQP/negotiated | M | TLV | 3-? |
| SourceCell ID | Source Cell identifier | M | | |
| TargetCell ID | Target Cell Identfier | M | | |
| TBF handover Target Cell Container | UL TBF parameters:<br>-MAC parameters:<br>PDCH mapping, TFI, USF<br>-RLC parameters: channel coding, RLC reset,<br>DL TBF parameters:<br>-MAC parameters:<br>PDCH mapping, TFI,<br>-RLC parameters: RLC reset,<br>Target Cell Frequency parameters;<br>PSI instances; a set of instances from the PSI: GPRS cell options; access bursts type (8 or 11-bits), (still TBD) | M | | |
| TBFHandover reference | TBFHandover_ref | O | | |
| Routing and Location related IE | BVCI, BSS Area Indication, Location Area, Routing Area | O | | |

Fig. 10b

PACKET-SWITCHED HANDOVER

BACKGROUND OF THE INVENTION

1. Field of the Invention

The invention relates in general to packet-switched services in cellular networks. In particular, the invention relates to a packet-switched handover procedure for a mobile station changing cells.

2. Description of the Related Art

A communication system can be seen as a facility that enables communication sessions between two or more entities such as user equipment and/or other nodes associated with the communication system. The communication may comprise, for example, communication of voice, data, multimedia and so on. Communication systems providing wireless communication for user equipment are known. Cellular communication systems are configured to have a cell structure, and typically they support communication with user equipment changing locations (mobile users). The support for communications for mobile users may include support for handing existing connections from one cell to another cell. At least routing of calls or communications for a mobile user in a new cell is typically supported in cellular systems. Some examples of a cellular system are the Global System for Mobile Telecommunications (GSM) and General Packet Radio Service (GPRS). GPRS provides packet-switched data services and utilizes the infrastructure of a GSM system. Two further examples of cellular systems are EDGE and EGPRS, which are further enhancements to GSM and GPRS. EDGE refers to Enhanced Data Rates for GSM Evolution, and EGPRS refers to EDGE GPRS.

For illustrating packet-switched services in cellular system, GPRS and EGPRS systems are used below as examples. It is, however, appreciated, that similar concepts may be found also in other cellular systems supporting packet-switched services.

In the following description, reference is made to certain Third Generation Partnership Project (3GPP) technical specifications. These technical specifications are known to a person skilled in the art of cellular networks.

FIG. 1 illustrates schematically, as an example of a cellular network supporting packet-switched services, a GSM/GPRS network 100. Alternatively, the system 100 may be an EDGE/EGPRS network. Only some of the network elements of a GSM/GPRS network are illustrated in FIG. 1. The radio access network 110 comprises a number of base station systems (BSS) 112a, 112b. Each base station system 112 comprises a base station controller (BSC) 114 and a number of base stations (BS) 116. A mobile station (MS) 101 communicates with a base station 116 over a radio interface. The packet-switched core network 120 of the system 100 comprises a number of GPRS Supporting Nodes (GSN) 122. Each mobile station registered for packet-switched services has a serving GSN, called SGSN, which is responsible for controlling the packet-switched connections to and from the mobile station. The packet-switched core network 120 is typically connected to further packet-switched networks via a Gateway GSN (GGSN).

FIG. 2 shows schematically the protocol stacks of some of the network elements illustrated in FIG. 1 and identifies some interfaces. The interface between an SGSN and a BSS is called Gb. In the SGSN protocol stack and in the BSS protocol stack towards the SGSN the following protocols are common. The lowest protocol is called Layer 1. The second protocol is Network Service (NS), and the third protocol is Base Station System GPRS Protocol (BSSGP). The fourth protocol in the SGSN protocol stack in Link Layer Control (LLC), and the counterpart for this protocol entity is found in the MS protocol stack.

The interface between a MS and a BSS is called Um. The protocols are common in the MS protocol stack and in the BSS protocol stack towards the MS are the following: the lowest protocol is called the physical layer (PHY), the second in the Media Access Control (MAC) protocol and the third in the Radio Link Control (RLC) protocol. In the MS protocol stack, there is further the LLC protocol and on top of that further protocols or applications. In the BSS protocol stack, data is relayed between the RLC protocol and the BSSGP protocol.

A GPRS or EGPRS network assigns a temporary identifier for a mobile station wishing to have access to packet-switched service. This identifier is a Packet-Temporary Mobile Subscriber Identifier (P-TMSI), and it is assigned by the SGSN. P-TMSI handling is discussed in TS 23.003 and TS 24.008. A further identifier, a Temporary Logical Link Identifier (TLLI), is used for addressing resources allocated for GPRS services at RLC/MAC layer on the Um interface and in the BSSGP layer on the Gb interface. The value for TLLI is built by the MS or by SGSN either on the basis of the Packet-Temporary Mobile Subscriber Identity (P-TMSI) or directly (random TLLI). TLLI handling is discussed in TS 23.003.

A packet data protocol (PDP) context refers to information sets held in MS and GPRS Supporting Nodes (GSNs) that are used to bind the MS to an PDP address that identifies an application, PDP type and a QoS profile. PDP context functions are discussed in 3GPP TS29.060.

For identifying MS PDP contexts, the TLLI identifier is used together with a Network layer Service Access Point Identifier (N-SAPI). N-SAPI is an identifier used at a Subnetwork Dependent Convergence Protocol (SNDCP) layer in a mobile station and in a SGSN.

A further identifier for identifying packet-switched services is the Packet Flow Identifier (PFI). The PFI identifier is assigned by the SGSN, and the PFI identifies a packet flow for a certain MS. A mobile station may have more than one packet flow.

Information related to quality of service characteristics of the user data transmission in GPRS/EGPRS for a specific packet flow is kept in a BSS Packet Flow Context (BSS PFC). A BSS PFC thus relates to one packet flow identified by a PFI. The BSS PFC is given to a BSS by the SGSN. BSS packet flow contexts related to one MS are stored in an MS specific BSS context identified by TLLI. Within the BSS context, a BSS PFC is identified by the packet flow identifier PFI.

A Temporary Block Flow (TBF) is allocated radio resources on one or more packet data channels (PDCHs) that comprise a number of RLC/MAC blocks carrying one or more upper layer PDUs. A TBF is temporary and is maintained only for the duration of the data transfer. A TBF may operate in either GPRS or EGPRS TBF mode. Radio Resources allocated for an MS are addressed by TLLI.

In the following, resources allocated for packet-data services in a GSM/EDGE Radio Access Network (GERAN) are discussed. Depending on which interface is used to connect the radio access network to the core network, there are two types of GERAN architectures: GERAN A/Gb mode and GERAN Iu mode. The following description relates in particular to GERAN A/Gb mode, thus it may not be applicable to GERAN Iu mode. There are two main identifiers for packet switched service classes and mobile stations in GERAN A/Gb mode: the Packet Flow Identifier (PFI) and the Temporary Logical Link Identity (TLLI).

A cell refers to a basic unit of the cellular network. Each base station may form a cell, or base station may be provided with transceivers, whereof each forms a cell. In a GPRS/EGPRS network, a mobile station 101 is communicating with one base station (cell) at a time. When the mobile station 101 moves, it changes cell. In a GSM network, term handover refers to handing over (circuit-switched) connections from the old (source) cell to a new (target) cell.

There is need also for a handover for the packet-switched connections. A packet-switched handover would minimize the service interruption times by allowing continuous data transfer between a MS and a cellular system, when the MS is moving from one cell to another cell. A packet-switched handover may be an intra-SGSN handover or an inter-SGSN handover. In an intra-SGSN handover, the source and target BSS are controlled by the same SGSN. In an inter-SGSN handover, the source BSS is controlled by a first (source) SGSN and the target BSS is controlled by a second (target) SGSN.

There exists a proposal in the 3GPP TSG GERAN, namely "Support of Conversational Services over the PS domain; Technical Report (Release 6)" version 0.8.0, for a packet-switched handover procedure in a GPRS/EGPRS network. This proposal provides the technical solutions to support conversational QoS class in the GERAN A/Gb mode. Conversational QoS class is used to carry real-time traffic flows most sensitive to delay. In this proposal, a packet-switched handover for conversational QoS class comprises two phases: a preparation phase and an execution phase.

FIG. 3 schematically illustrates, as an example of a packet-switched inter-SGSN handover, the preparation phase of an inter-SGSN PS handover in accordance with the above mentioned proposal. In phase 301, a source BSS makes a decision to perform an A/Gb PS Handover. The source BSS then sends a PS Handover Required message 302 to the source SGSN. This message 302 contains various identifiers, including a target cell identifier. Based on the target cell identifier, the source SGSN determines the target SGSN, and thereafter informs the target SGSN about the handover with Prepare PS Handover Request message 303. Upon receipt of this message, the target SGSN assigns a P-TMSI value for the mobile station in phase 304. Then the target SGSN send a PS Handover Request message 305 to the target BSS. In phase 306 radio resources are allocated in the target BSS for the packet-switched services relating to the mobile station. After radio resource allocation, the target BSS sends a PS Handover Request Acknowledgement 307 to the target SGSN. The target SGSN sends then a Prepare PS Handover Response message 308 to the source SGSN. In phase 309, the source SGSN starts bi-casting packet data to the target SGSN.

In the beginning of the execution phase of the proposed packet-switched handover, the source SGSN sends a PS Handover Command message to the source BSS. The source BSS, in turn, sends PS Handover Command message to the mobile station. The P-TMSI value assigned by the target SGSN is delivered to the mobile station in this PS Handover Command message. The mobile station changes cells from the source cell to the target cell, and after certain procedures relating to the cell change The execution phase continues with a PS Handover Complete Message sent by the mobile station to the target BSS. The target BSS sends a PS Handover Complete message to the target SGSN. Thereafter the target SGSN and the GGSN update PDP context with Update PDP Context Request and Update PDP Context Response messages. After the PDP context update in the GGSN, the target SGSN sends a Forward PS Handover Complete message to the source SGSN. The source SGSN responds with a Forward PS Handover Complete Acknowledgement message. Thereafter BSS packet flow procedures are carried out between the source SGSN and the source BSS. In the end of the execution phase, a routing area update (RAU) procedure is carried out. The mobile station initiates this routing area update by sending a RAU Request message.

In the above discussed inter-SGSN packet-switched handover (FIG. 3), a target SGSN needs to assign a P-TMSI for the MS for the target cell before the MS is residing in the target cell. In addition to the above mentioned example, a SGSN may need to assign a new P-TMSI for a MS also in an intra-SGSN handover. This is the case, for example, when the source cell and the target cell belong to different routing areas (RA).

As mentioned above, the proposed packet-switched handover procedure is a quite a complex procedure having a preparation phase and an execution phase. A set of messages relating to packet-switched handover is defined, this set comprising at least nine new messages: PS Handover Required, Prepare PS handover Request, PS Handover Request, PS Handover Request Acknowledge, Prepare PS Handover Response, PS Handover Command, PS Handover Complete, Forward PS Handover Complete, and Forwards PS Handover Complete Acknowledge. It should be also noted that failure scenarios may become quite cumbersome with such a handover procedure having a preparation phase and an execution phase and a significant number of signaling messages between various network elements.

Furthermore, there may be need for some changes also in the Routing Area Update procedures, as the BSS PFC (Packet Flow Context), MM, and PDP contexts need to be exchanged during the packet-switched handover procedure.

Furthermore, the mobile station should also be able to cope with possible failures in the handover procedure. An example of such a possible failure is that access in the target cell fails and the MS returns to the source cell.

One aim of the embodiments of the present invention is to present a straightforward procedure for a packet-switched handover.

SUMMARY OF THE INVENTION

In accordance with a first aspect of the invention, there is provided a method for performing a packet-switched handover from a first cell to a second cell in a cellular network, said method comprising the steps of:
  providing packet-switched services for a mobile station in the first cell based on a set of information relating to provision of packet-switched services and a protocol for handling provision of packet-switched services for mobile stations, said protocol being a protocol between a cell and a respective control network element,
  receiving from the first cell in a control network element relating to the first cell a first message indicating a request for a packet-switched handover for a mobile station, and
  sending, in response to said first message, to the second cell a second message requesting creation of a set of information relating to provision of packet-switched services for the mobile station in the second cell, the second message being a message of said protocol for handling provision of packet-switched services for mobile stations.

In accordance with a second aspect of the invention, there is provided a network element for a cell in a cellular network providing packet-switched services for mobile stations, said network element being configured to handle provision of packet-switched services for a mobile station in said cell based on a set of information relating to provision of packet-switched services and a protocol for handling provision of packet-switched services, and to initiate preparations for a packet-switched handover of the mobile station to said cell upon receipt of a message requesting creation of a set of information relating to provision of packet-switched services for the mobile station, said message being a message of the protocol for handling provision of packet-switched services.

In accordance with a third aspect of the invention, there is provided a control network element for a cell in a cellular network providing packet-switched services for mobile stations, said control network element being configured to handle provision of packet-switched services for mobile stations in at least said cell using a protocol for handling provision of packet-switched services, and to send, in response to receipt of a message indicating a request for a packet-switched handover of a mobile station to the cell from a further cell, to the cell a message requesting creation of a set of information relating to provision of packet-switched services for the mobile station in the cell.

In accordance with a fourth aspect of the invention, there is provided a cellular network having a first cell, a second cell and a control network element for at least the first cell, said cellular network being configured to provide packet-switched services for a mobile station based on a set of information relating to provision of packet-switched services and a protocol for handling provision of packet-switched services for mobile stations, said protocol being a protocol between a cell and a respective control network element, to receive from the first cell in the control network element a first message indicating a request for a packet-switched handover for a mobile station in the first cell, and to send, in response to said first message, to the second cell a second message requesting creation of a set of information relating to provision of packet-switched services for the mobile station in the second cell, the second message being a message of said protocol for handling provision of packet-switched services for mobile stations.

In the embodiments of the invention, cells of a cellular network are typically organized into groups. There is a control network element for each group of cells. In a handover procedure, a first message requesting a packet-switched handover is sent from a first cell (source cell) to a control network element of the first cell. The control network element of the first cell determines whether the second cell (target cell) belongs to the same group of cells as the first cell or whether a further control network element needs to be involved in the handover procedure.

In the embodiments of the invention, when the control network element of the first cell controls also the second cell, the control network element of the first cell sends to the second cell the second message requesting creation of a set of information relating to provision of packet-switched services for the mobile station in the second cell.

Alternatively, if the control network element finds out that a further control network element controls the second cell, the control network element sends a message requesting a handover to the further control network element. This further control network element then sends to the second cell the second message requesting creation of a set of information relating to provision of packet-switched services for the mobile station in the second cell.

In the appended claims, sending of the second message in response to the first message covers both a packet-switched handover procedure, where one control network element is involved, and a packet-switched handover procedure, where also a further control network element is involved. Furthermore, it is possible that other network elements than the further control element of the second cell are involved in the procedure following the receipt of the first message. Because in normal operation, the second message is always sent in the packet-switched handover procedure when the first message is received, the second message is sent in response to the first message.

BRIEF DESCRIPTION OF THE DRAWINGS

Embodiments of the present invention will now be described by way of example only with reference to the accompanying drawings, in which:

FIG. 4 shows some messages relating to a packet-switched handover in accordance with an embodiment of the invention;

FIG. 5 shows a message sequence chart of an intra-SGSN packet-switched handover in accordance with an embodiment of the invention;

FIGS. 6a to 6f show Tables 1 to 6 relating to messages in accordance with an embodiment of the invention;

FIGS. 9a to 9e show Tables 7 to 11 relating to messages in accordance with an embodiment of the invention;

FIGS. 10a to 10c show Tables 12 to 14 relating to further messages in accordance with an embodiment of the invention;

DETAILED DESCRIPTION OF THE PREFERRED EMBODIMENTS

Figure 1:
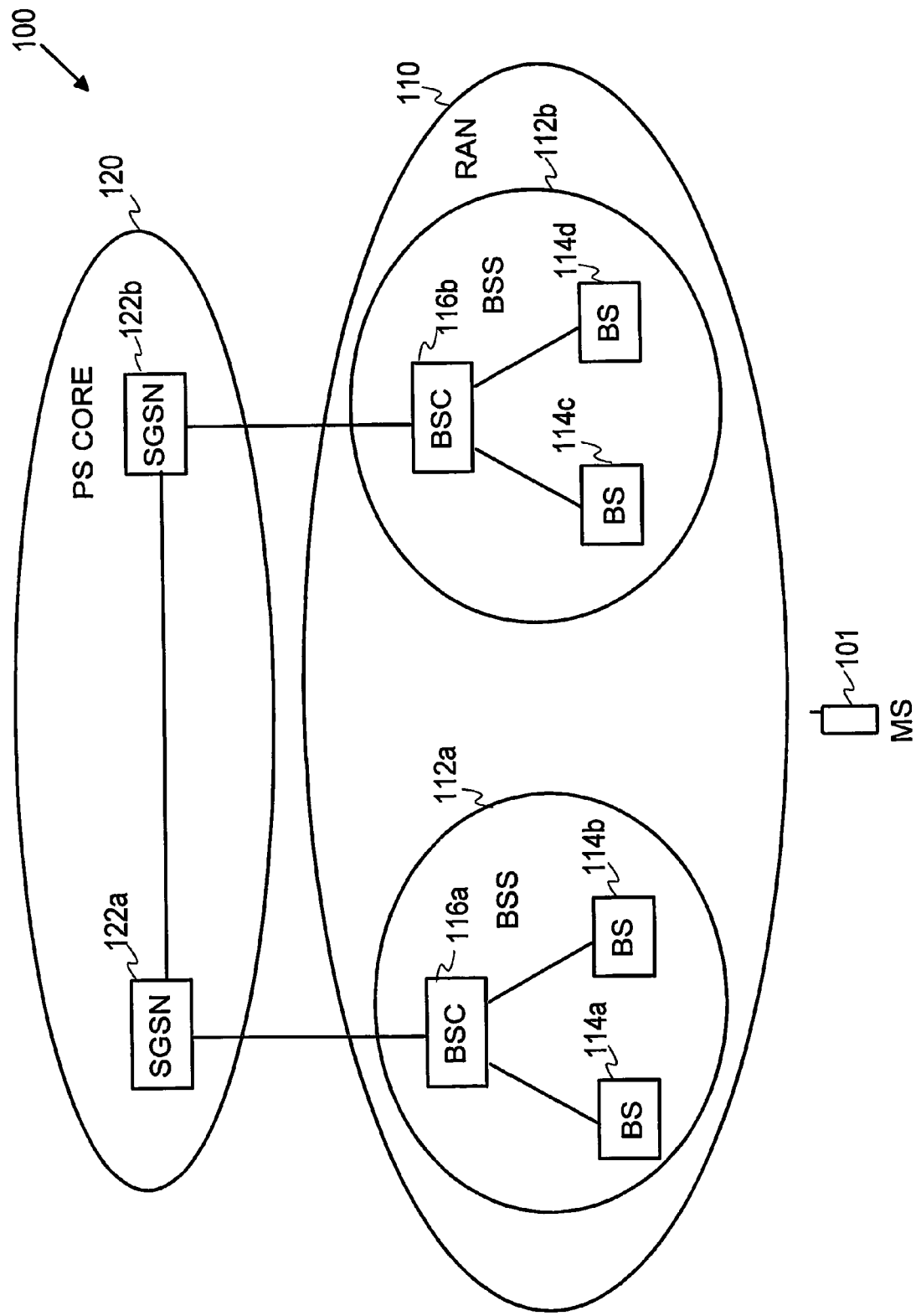
FIG. 1 shows schematically a cellular communication system with which embodiments of the invention can be used.
Figures 2, 12:
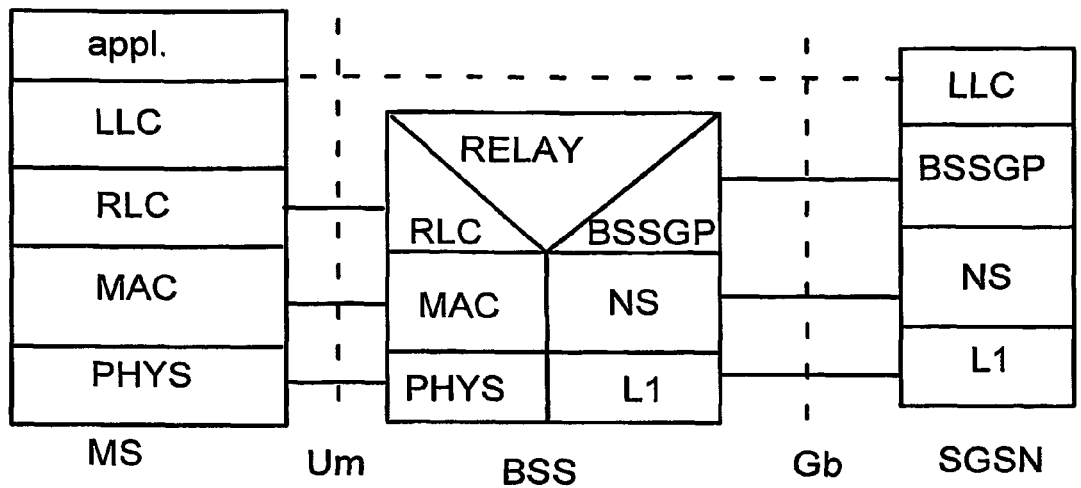
FIG. 2 shows schematically protocol stacks of some network elements shown in FIG. 1.
FIG. 12 shows Table 15 relating to a Handover TLLI.
Figure 3:
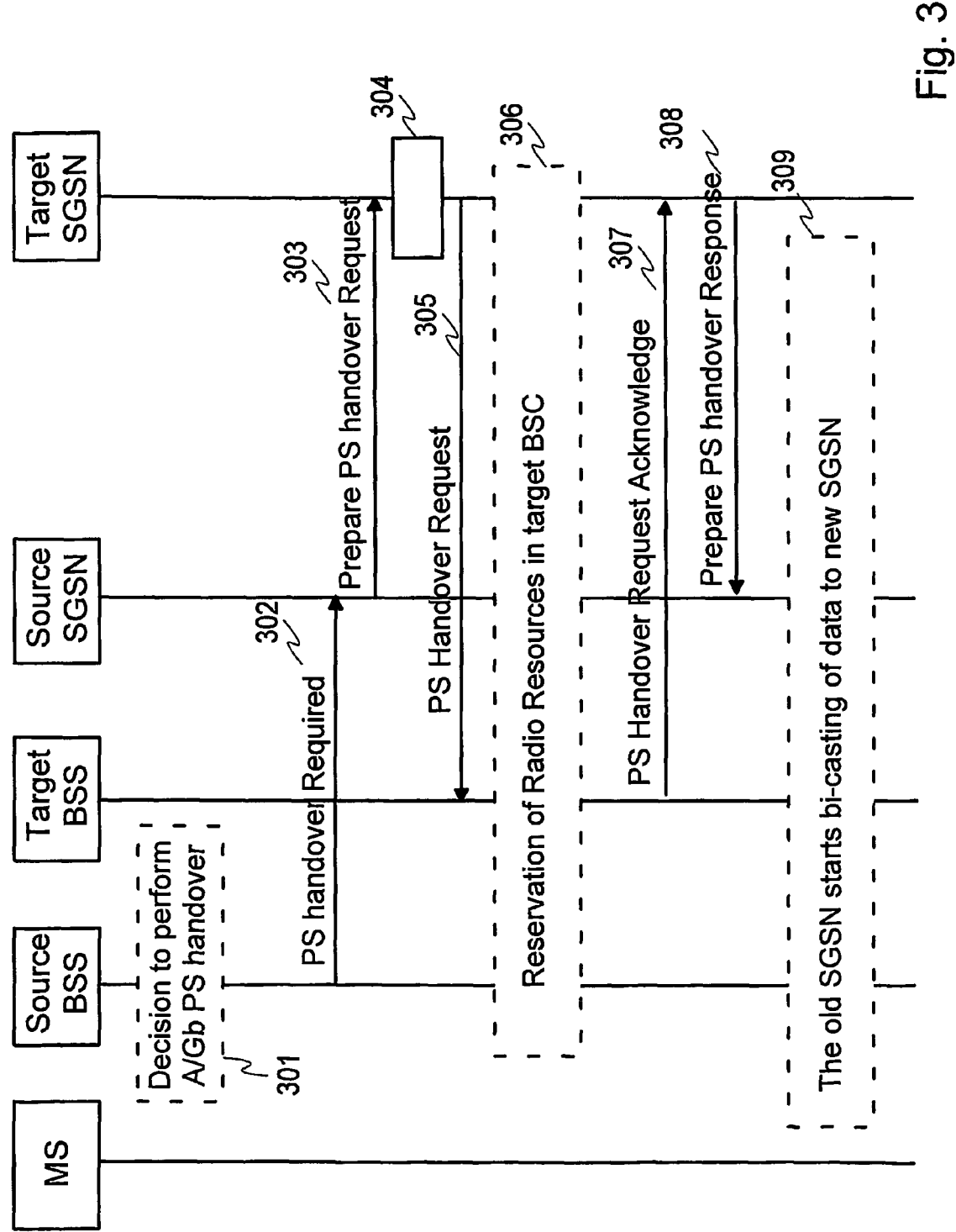
FIG. 3 shows a message sequence chart relating to a proposed packet-switched handover procedure.

FIGS. 1 to 3 have been discussed above in connection with the description of prior art.

In the following description of the embodiments of the invention, reference is often made to a GPRS or EGPRS system. It is, however, appreciated that the invention may be applicable to other cellular systems supporting packet-switched data services.

In a cellular network there is a protocol between a cell and a control network element of the cell for handling the provision of packet-switched services for a mobile station. The protocol for handling the provision of packet-switched services typically conveys routing information and data transfer characteristics. Data transfer characteristics refers here to quality of service information and similar characteristics. In GPRS/EGPRS a protocol between a control element and a cell for handling the provision of packet-switched services is the BSS GPRS protocol (BSSGP). The BSSGP is, in addition, responsible to provision of functionality to enable SGSN and BSS to operate node management control functions.

For supporting packet-switched services for a mobile station, a cell needs to know data transfer characteristics for packet flows. Typically there is a set of information relating to provision of packet-switched services for a specific mobile station. The set of information relating to provision of packet-switched services on the Gb interface is in GPRS/EGPRS a BSS context. Furthermore, typically the set of information contains packet-flow-specific information for each packet flow. This packet-flow-specific set of information is generally called a packet flow context. In GPRS/EGPRS a packet-flow-specific set of information relating to the provision of packet-switched services is a BSS Packet Flow Context (BSS PFC).

A packet-switched handover refers to a mobile station changing cells from a source cell to a target cell so that data transfer relating to at least one packet flow of the mobile station is set up in the target cell without a significant interrupt in the packet data transfer. The length of the interrupt that is tolerable typically depends on the characteristics of the packet-switched service.

A packet-switched handover may be requested for all packet-switched services, that is for all packet flows, relating to the mobile station subject to the packet-switched handover. Alternatively, it is possible that a packet-switched handover is requested only for some of the packet flows relating to a mobile station. The decision for which packet flows to request a handover is out of the scope of the present invention, and is not discussed here in detail. Similarly, the decision for which packet flows a requested handover is accepted and is to be performed, is not discussed here in detail.

As the provision of packet-switched services is typically based on packet flow contexts, packet flow contexts need to be transferred from the source cell to the target cell. At least packet flow contexts of those packet flows that are accepted for a packet-switched handover need to be transferred.

The embodiments of the invention concentrate on transfer of the set of information relating to provision of packet-switched services, especially on the transfer of the packet flow contexts, from the source cell to the target cell. The protocol for handling provision of packet-switched services typically contains messages for handling (creating, modifying, deleting) a set of information relating to provision of packet-switched services. The messages may be packet-flow specific, that is there may be messages for creating a packet flow context in a cell and for deleting a packet flow context in a cell. These messages, perhaps slightly modified, can be used for transfer of one or more packet flow context in connection with a packet-switched handover.

The embodiments of the invention provide a straightforward packet-switched handover, as the procedure concentrates on the transfer of a set of information relating to provision of packet-switched services or, more particularly, on the transfer of packet flow contexts. A message requesting creation of a set of information relating to provision of packet-switched services for the mobile station in a target cell is sent in response to a message indicating a request of a packet-switched handover for the mobile station in the source cell.

It is appreciated that the message indicating a request of a packet-switched handover need not be a message of the same protocol to which the message requesting creation of a set of information relating to the provision of packet-switched services. It is, however, noted that if the messages belong a single protocol, the processing of the messages is simpler and more straightforward than if more than one protocol is involved.

It is appreciated that, for some reason, a mobile station subject to a packet-switched handover may already have a set of information relating to provision of packet-switched services in the target cell. This mobile station may, for example, have been in the target cell recently. In this case, there is no need to send the message for creating a set of information relating to provision of packet-switched services. A message for modifying the set of information may be used if the data transfer characteristics have changed.

There is thus no need define a new protocol for the packet-switched handover. It is sufficient to modify some existing messages of the protocol for handling provision of packet-switched services and to define a few new messages for the protocol. Some messages need to be defined between two control elements, for supporting a packet-switched handover between a source cell and a target cell controlled by two control network elements.

In the following, some embodiments of the invention are discussed in connection with a GPRS or EGPRS system and BSS GPRS protocol. It is, however, appreciated that similar messages may be defined in other protocols in other cellular systems supporting packet-switched services. It is furthermore appreciated that in the following a BSS PFC is a specific example of a packet flow context relating to a certain cell and to a certain mobile station.

In order to support conversational packet switched services in GERAN A/Gb mode (GPRS, EGPRS) there is a need for a packet-switched handover mechanism. As part of the packet-switched handover mechanism it is required to support BSS PFC handover procedures between source and target network nodes.

In GERAN A/Gb mode, QoS characteristics for the data transmission are given in the BSS packet flow contexts (PFC). BSS PFCs related to one MS are stored into a single BSS context. In order to enable continuous data transmission and to minimize service interruption in connection with a packet-switched handover, there is a need to handover the BSS PFC for this MS from the source cell nodes to the target cell nodes.

In embodiments of the invention, enhanced BSS PFC procedures are defined to support handover of BSS PFCs between source and target cell nodes. Depending on whether the mobile station is moving within the cells belonging to BSCs controlled by the same SGSN or by different SGSNs, two handover procedures are defined. For an inter-SGSN handover, a BSS PFC Handover procedure is used for the handover of BSS PFCs from the source BSS to the target BSS. For an intra-SGSN handover, a SGSN BSS PFC Handover procedure is used for the handover of SGSN BSS PFCs from the source SGSN to the target SGSN. This is only needed in case of Inter-SGSN TBF handover.

In connection with FIGS. 4 and 5, the BSS PFC Handover procedure is discussed. FIG. 4 shows new messages relating to packet-switched handover in the source cell (left-hand side) and in the target cell (right-hand side). These signaling messages are preferably part of the BSSGP protocol.

A Handover BSS PFC Request message 401 from the source BSS to the source SGSN indicates a request for handover of one or more PFCs relating to a mobile station. A Handover BSS PFC Accept message 402 from the source SGSN to the source BSS indicates an acceptance for packet-switched handover of one or more BSS PFCs, these BSS PFCs belonging to those BSS PFCs for which handover was requested with message 402. The handover of BSS PFC(s) not listed in the Handover BSS PFC Accept message 402 but requested in the message 401 may be considered rejected.

This way there is no need to specify separately BSS PFC(s) for which a handover was requested but not accepted. A Handover BSS PFC Reject message 403 from the source SGSN to the source BSS indicates rejection of handover of all those BSS PFCs, for which handover was requested with message 402.

A Handover BSS PFC Detect message 404 from the target BSS to the target SGSN indicates that the mobile station has successfully accessed the target cell. This message 404 is optional. A Handover BSS PFC Complete message 405 from the target SGSN to the target BSS indicates the successful completion of the handover procedure. A Handover BSS BFC Failure message 406 from the source BSS to the source SGSN is sent in the case of failure of the handover procedure in the target cell. The Handover BSS PFC Reject message 403 indicating an appropriate cause may be sent from the source SGSN to the source BSS after the message 406, if the packet-switched handover fails.

These BSS PFC Handover Messages of FIG. 4 typically need to carry information related to the MS identification: TLLI derived from a valid P-TMSI, List of PFIs identifying BSS PFC subject to handover, QoS Profiles for each corresponding BSS PFC, source cell identifier, target cell identifier, and a TBF_Handover_Container. The TBF_Handover_Container carries information relevant for the packet-switched handover for each corresponding PFC. This information includes, for example, TBF parameters in the source cell like TBF mode, RLC mode, or radio resource assignment information in the target cell. Tables 1 to 6 provide further details.

FIG. 5 illustrates the relation between existing BSSGP signaling messages and the BSS PFC Handover message in an intra-SGSN TBF Handover. The packet-switched handover on the Gb interface starts with a Handover BSS PFC Request message 401 from the source BSS to the SGSN. This message 401 is an example of a message indicating a request for a handover for packet switched services of a mobile station (a first message in the appended claims). The SGSN, in response to the Handover BSS PFC Request message 401, sends to the target BSS a Create BSS PFC Request message 501. This message 501 is an example of a message requesting creation of a set of information relating to packet switched services of the mobile station (a second message in the appended claims). In the BSSGP there exists a Create BSS PFC Request message requesting creation of one or more BSS PFC, for example, when a new packet-switched connection is established for a mobile station. The message 501 initiates preparations for the packet-switched handover in the target cell.

The existing Create BSS PFC request needs to be modified so that it includes information elements for use in the BSSGP for use in the packet-switched handover. The modification is to add information elements related to the Source Cell Identifier, Target Cell Identifier and TBF Handover Source Cell Container. Otherwise there is no need to modify create BSS PFC procedure. The target BSS responds by sending a Create BSS PFC Accept message 502 to the SGSN. This message 502 is an example of a message sent from the target cell and indicating acceptance of the request for handover for packet-switched services (a third message in the appended claims). This message 502 is a modified Create BSS PFC Accept message of the BSSGP protocol. The modification is to add to the message information elements related to Source Cell Identifier, Target Cell Identifier, TBF Handover Target Cell Container for the list of accepted PFIs and optionally TBF handover reference and Routing and Location Area Information.

The SGSN sends to the source BSS a Handover BSS PFC Accept message 402 once the SGSN has received the Create BSS PFC Accept message 502. This message 402 is an example of a message sent to the first cell, the message indicating acceptance of the handover for packet switched services of the mobile station (a fourth message in the appended claims). After the MS has moved to the target cell and the packet-switched handover procedure has been successfully completed, the target BSS sends to the SGSN a Handover BSS PFC Complete message 405. This message 405 is an example of a message received from the target cell and indicating completion of the handover for packet switched services of the mobile station (a fifth message in the appended claims). Before sending this Handover BSS PFC Complete message 405, the target BSS may send to the SGSN a Handover BSS PFC Detect message 404.

Upon receiving the Handover BSS PFC Complete message 405, the SGSN sends to the source BSS a Delete BSS PFC Request message 503. Upon receipt of this message 503, the source BSS deletes all the BSS packet flow context(s) of the mobile station. Alternatively, it is possible to delete the packet flow context(s) of the PFI(s) indicated in the message 402 in the source cell upon receipt of the message 402. This may, however, cause problems in some failure scenarios. The source BSS responds to the source SGSN by sending a Delete BSS PFC Accept message 504. In the BSSGP protocol, there exist a message for deleting BSS PCFs and for accepting deletion of the BSS PFCs. Messages 503 and 504 may be these existing BSSGP protocol messages. The message 503 is an example of a message for deleting a set of information relating to packet switched services of the mobile station (a sixth message in the appended claims).

FIGS. 6a to 6f show Tables 1 to 6, which give, by the way of example, details about the content of the Handover BSS PFC messages 401 to 406. Tables 1 to 6 show information elements of the protocol data units (PDUs), and the types of the information elements. Furthermore, Tables 1 to 6 show the mandatory (M) or optional (O) presence of the information elements in the PDUs, the format of the information elements and the length of the information elements. The format is V or TLV (Type, Length, Value). Blank entries in Tables indicate that the presence, content or format of the information is to be specified.

Table 1 shows the content of a Handover-BSS-PFC PDU, which relates to the Handover BSS PFC Request message 401. Table 2 shows the content of a Handover-BSS-PFC-ACK PDU, which relates to the Handover BSS PFC Accept message 402. Table 3 shows the content of a Handover-BSS-PFC-NACK PDU, which relates to the Handover PCF Reject message 403. Table 4 shows the Handover-BSS-PFC-Detect PDU, which relates to the Handover BSS PFC Detect message 404. Table 5 shows the Handover-BSS-PFC-Complete PDU, which relates to the Handover BSS PFC Complete message 405. Table 6 shows a Handover-BSS-PCF-Failure PDU, which relates to the Handover BSS PFC Failure message 406.

For each of the PDUs shown in Tables 1 to 6, there is need to define a new PDU type.

Figure 7:
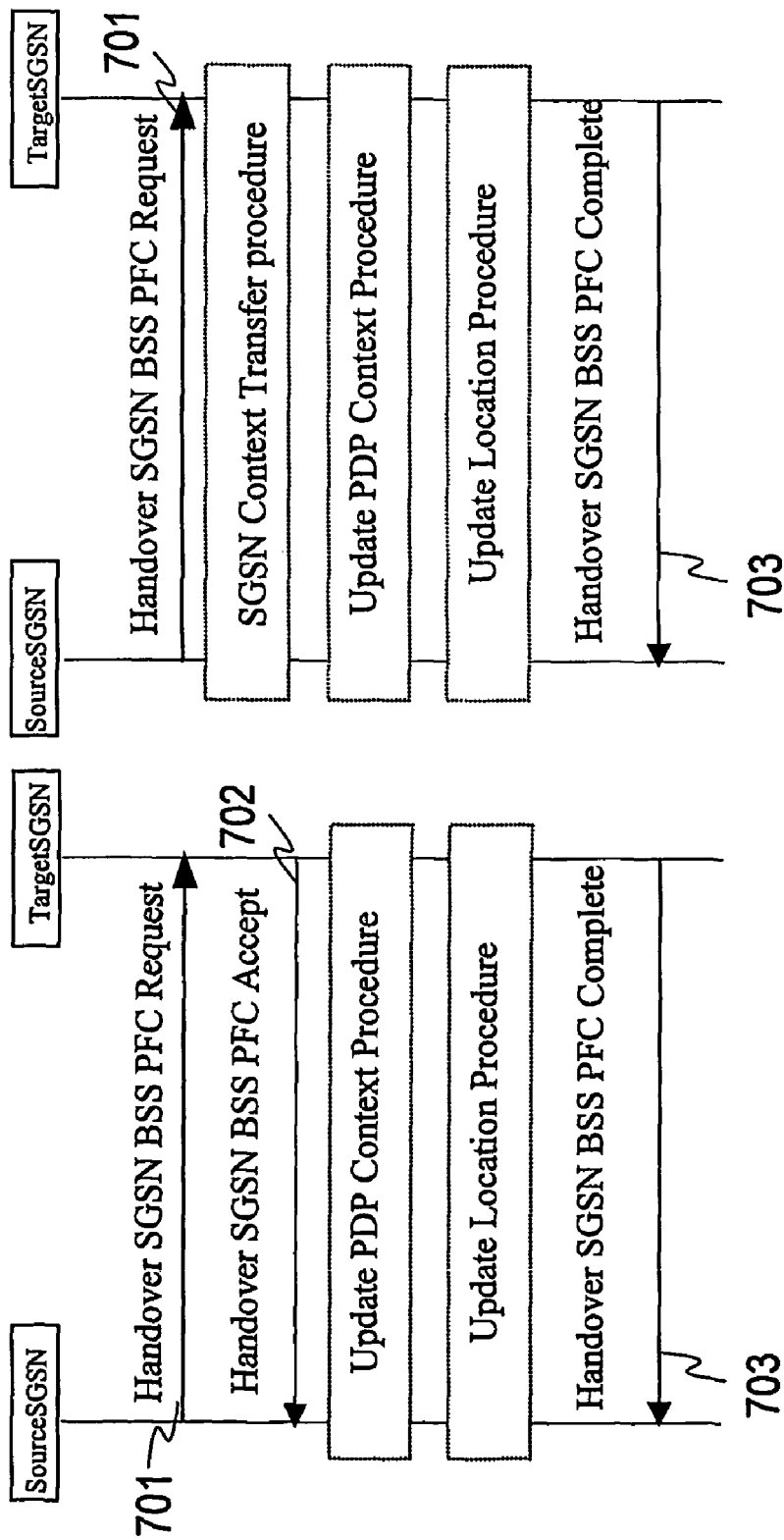
FIG. 7 shows some messages relating to an inter-SGSN packet-switched handover procedure in accordance with an embodiment of the invention.

For an inter-SGSN packet-switched handover, a SGSN BSS PFC Handover procedure is defined in embodiments of the invention. FIG. 7 shows messages relating to the SGSN BSS Handover only. These signaling messages are preferably part of the BSSGP protocol.

Figure 8:
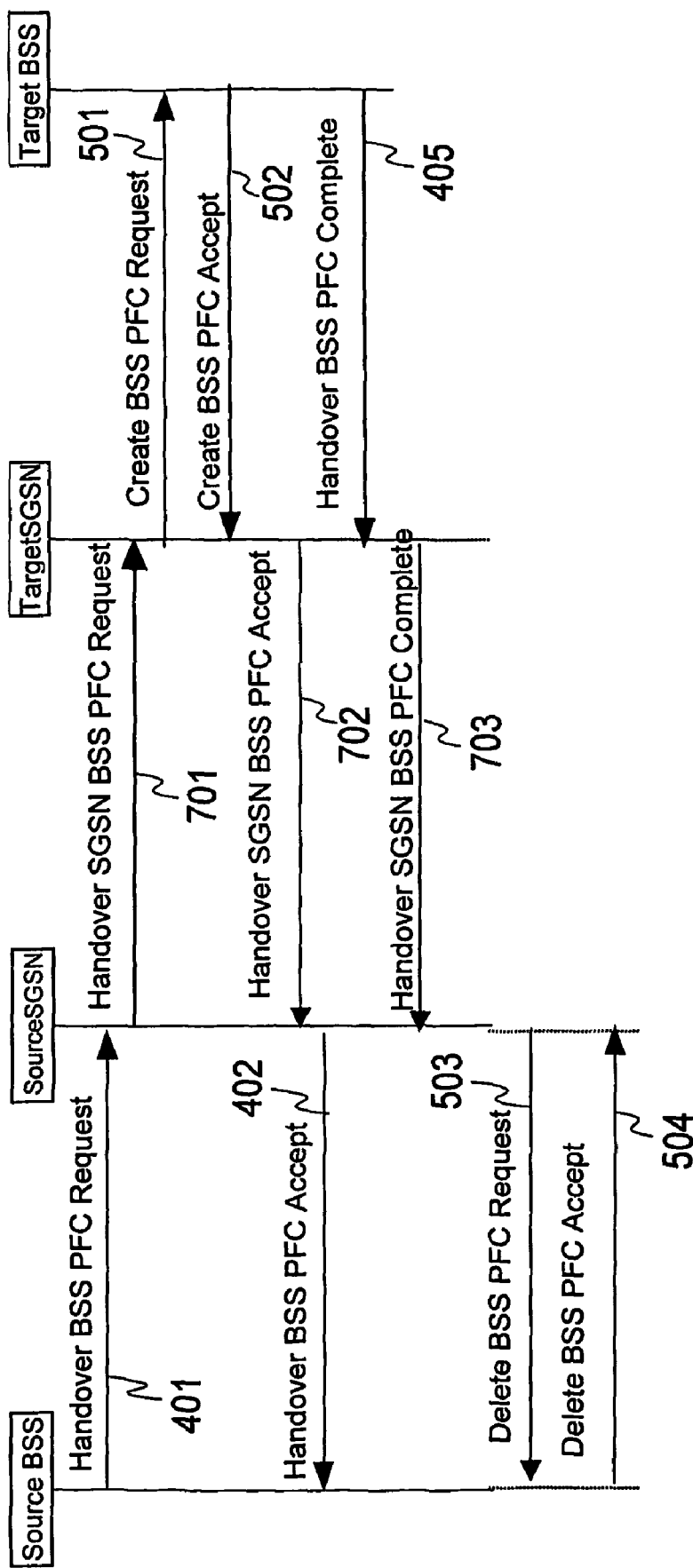
FIG. 8 shows a message sequence chart relating to an inter-SGSN packet-switched handover procedure in accordance with an embodiment of the invention.

FIG. 8 shows messages relating to an inter-SGSN packet-switched handover, that is also messages between the SGSNs and the BSSs. The SGSN BSS PFC procedure is initiated by the source SGSN upon receipt of a Handover BSS PFC Request message 401 (see FIG. 8), if the packet-switched handover is an inter-SGSN handover. The Handover SGSN BSS PFC Request message 701 indicates a request for handover of one or more PFC.

Upon receiving the Handover SGSN BSS PFC Request message 701, the target SGSN may perform SGSN Context handover, Update PDP Context and Location Update procedures in the same manner and order as during Routing Area Update procedures. Alternatively, the Handover SGSN BSS PFC Request message 701 may carry information for transferring PDP and MM contexts to the target SGSN. In this case, it is sufficient to carry out the Update PDP Context and Location Update procedures between the source SGSN and the target SGSN.

FIG. 7 shows these two scenarios for a SGSN BSS PFC Handover procedure. In the procedure shown in the left-hand side of FIG. 7, the Handover SGSN BSS PFC Request message 701 carries information for transferring PDP and MM contexts to the target SGSN. In the alternative procedure shown in the right-hand side of FIG. 7, a SGSN context transfer procedure is used for transferring PDP and MM contexts.

In the procedure in the left-hand side of FIG. 7, the source SGSN sends a Handover SGSN BSS PFC Request message 701 to the target SGSN. This message 701 indicates the request for handover of one or more PFCs of a mobile station and contains information for transferring PDP and MM contexts to the target SGSN. The target SGSN indicates acceptance of the handover request of one or more PFCs by sending a Handover SGSN BSS PFC Accept message 702. Thereafter the Update PDP Context procedure and Update Location procedure are carried out between the source SGSN and the target SGSN.

In the alternative procedure in the right-hand side of FIG. 7, the source SGSN sends a Handover SGSN BSS PFC Request message 701 to the target SGSN. Thereafter a SGSN Context Transfer Procedure is carried out between the source SGSN and the target SGSN. A SGSN Context Acknowledge message from the target SGSN to the source SGSN indicates acceptance of the request for handover in this alternative procedure. The SGSN Context transfer procedure signaling messages need to be enhanced with new information elements related to TBF handover. The accepted BSS PFC are specified in the SGSN Acknowledge message. The Update PDP Context procedure and the Update Location procedure are carried out between the source SGSN and the target SGSN similarly as in the procedure shown in the left-hand side of FIG. 7.

Upon receiving the Handover SGSN BSS PFC Request message 701, the target SGSN sends to the target BSS the Create BSS PFC Request 501. The target BSS acknowledges the handover of some or all PCFs with the Create BSS PFC Accept message 502, as discussed above in connection with FIG. 5. This signaling between the target SGSN and the target BSS is carried out before sending the Handover SGSN BSS PFC Accept message 702 or the SGSN context transfer.

As FIG. 8 shows, the packet-switched handover continues by the source SGSN sending a Handover BSS PFC Accept message 402 to the source BSS. The message 402 is sent by the source SGSN after receipt of the Handover SGSN BSS PFC Accept message 702 or receipt of the SGSN Context Acknowledge message. Similarly as in an intra-SGSN packet-switched handover, the target BSS sends a Handover BSS PFC Complete message 405 if the mobile station successfully accesses the target cell. In the inter-SGSN handover, this message is sent to the target SGSN.

As shown in FIGS. 7 and 8, the target SGSN indicates a successful completion of the SGSN BSS PFC Handover procedure for the accepted PFC(s) by sending a Handover SGSN BSS PFC Complete message 703 to the source SGSN. After receiving this message 703, the source SGSN deletes BSS PFC in the source cell by means of a Delete BSS PFC Request message 503, similarly as in an intra-SGSN handover.

The Handover SGSN BSS PFC Request message 701 carries parameters related to the MS and TBF handover. Some examples of these parameters are the following: IMSI, Tunnel Endpoint Identifier Signaling, PFI list, source cell identifier, target cell identifier, TBF handover Container and ImplicitRAUContainer. The TBF Handover Container carries information relevant for TBF handover for each corresponding PFC, for example TBF parameters in the source cell like TBF mode and RLC mode.

It is appreciated that the Handover SGSN BSS PFC Request message 701 may also be used as an implicit RAU request, such that Information Elements as in RAU Request are included in the Handover SGSN BSS PFC Request message 701 in RAU Container.

In addition to the message 701, 702 and 703 further messages for the SGSN BSS PFC handover may be defined. A Handover SGSN BSS PFC Reject message may be sent from the target SGSN to the source SGSN. This message indicates the failure of packet-switched handover procedure and/or rejection of handover for all PFCs for which handover was requested. This Handover SGSN BSS PFC Reject message may also be sent after the Handover SGSN BSS PFC Accept or SGSN Context Acknowledge message.

A Handover SGSN BSS PFC Failure message, from the source SGSN to the target SGSN, indicates the failure of packet-switched handover procedure in the target cell. A mobile station may fail to access the target cell and may return to the source cell. The source BSS/SGSN notices that the mobile station is returning to the source cell, and the source SGSN informs the target SGSN of a failure in the handover procedure. This message may also be sent after the Handover SGSN BSS PFC Accept message 702 or SGSN Context Acknowledge message.

It is appreciated that if a Gb-flex solution is used, there is no need for the SGSN BSS PFC Handover procedure. In a Gb flex solution a mobile station may move in a pool area consisting of a plurality of cells without changing GSNs. One or more GSNs in parallel serve the pool area, and all cells controlled by a Base Station Controller belong to the one or more pool areas.

FIGS. 9a to 9e shows Tables 7 to 11, which list, by the way of example, information elements in the Handover SGSN BSS PFC messages. Furthermore, Tables 7 to 11 show the mandatory (M) or optional (O) presence of the information elements in the protocol messages, and Tables 7 to 11 refer to Sections of TS specifications for further information.

Table 7 lists information elements relating to the Handover SGSN BSS PFC Request message 701. The PDP Context in Table 7 refer to the PDP Context(s) of the PFI(s) for which handover is requested. It is noted that the SAPIs and NSAPIs listed in Table 7 are part of the PDP Contexts. Table 8 lists information element relating to the Handover SGSN BSS PFC Accept message 702. Table 9 lists information elements relating a Handover SGSN BSS PFC Reject message. Information element "Cause" may be used for indicating the cause for a rejected handover request, for example, unavailability of resources in the target cell. Table 10 lists information elements in the Handover SGSN BSS PFC Complete message 703. Table 11 lists information elements in the Handover SGSN BSS PFC Failure message.

A packet switched handover performed in the above discussed manner does not introduce any changes in the existing BSS PFC procedures for creating and deleting the BSS PFCs. Some new Information Elements may be required in the CREATE BSS PFC signaling messages. These elements are listed, by way of example, in Tables 12 to 14 shown in FIGS. 10a to 10c.

Table 12 lists Information Elements of a Create-BSS-PFC PDU. This PDU allows a SGSN to request that a BSS creates or modifies a BSS Packet Flow Context. The following information elements listed in Table 12 are new in the Create-BSS-PFC PDU: source cell identifier (SourceCell ID), target cell identifier (TargetCell ID), and TBF parameters in the source cell (TBC Handover Source Cell Container).

It is appreciated that a single Create BSS PFC message is preferably used for creating a plurality of PFCs to be subject to a handover procedure at a time. All PCFs of a mobile station to be subject to a handover procedure are thus preferably listed in one Create BSS PFC message.

Table 13 lists Information Elements of a Create-BSS-PFC-ACK PDU. This PDU allows the BSS to acknowledge a request from the SGSN for the creation or modification of a BSS Packet Flow Context. The following information elements are new: TBF Handover Target Cell Container, TBF Handover reference, and Routing and Location related IE. The TBF Handover Target Cell Container contains the information indicated in the Type/Reference column. Similarly, the Routing and Location related information element contains the information indicated in the Type/Reference column. There should preferably be in the Create-BSS-PFC-ACK PDU one PFI information element and one ABQP information element for each PFI whose creation is acknowledged in connection with the packet-switched handover.

Table 14 lists Information Elements of a Create-BSS-PFC-NACK PDU. This PDU allows the BSS to respond negatively to a request for creating a BSS Packet Flow Context. There should be one PFI information element for each PFI whose creation is negatively acknowledged in connection with the packet-switched handover.

The above discussed enhanced BSS PFC procedures (that is BSS PFC Handover and SGSN BSS PFC Handover) need not introduce any changes to the existing air interface procedures. New information elements are, however, needed in some RLC/MAC control messages, for example in a Packet Cell Change Order message. The Packet Cell Change Order message needs to be enhanced with a <TBF_handover_struct> containing the following information on the target cell: list of PFIs for which resources are allocated in the target cell, and a TBF Target Cell Container. The TBF Target Cell Container contains the following information: UL TBF parameters including MAC parameters (PDCH mapping, TFI, USF) and RLC parameters (channel coding, RLC reset); DL TBS parameters including MAC parameters (PDCH mapping, TFI) and RLC parameters (RLC reset); target cell frequency parameters; PSI instances including a set of instances from the PSI such as GPRS cell options, access bursts type and other information that enables the access in the GPRS target cell; and TBF Handover reference.

It is furthermore possible that signaling messages relating to the packet-switched handover procedure contain information about RLC buffers, so that RLC buffers may be relocated in connection with the packet-switched handover procedure.

It is appreciated that in some embodiments of the invention, it is possible to use TLLI values of a local type or of a foreign type. A local type for the TLLI identifier is defined for use in a cell for which a P-TMSI has been assigned by the SGSN. A foreign type of TLLI identifier is defined for use in a cell for which no P-TMSI value has been assigned.

It is appreciated that some of Tables 1 to 13 mention a Handover TLLI. This Handover TLLI is used in other embodiments of the invention. The Handover TLLI is a type of TLLI, which is valid both in the source cell and in the target cell. The value of the Handover TLLI is typically determined based on a value of the P-TMSI identifier in the source cell. The Handover type of TLLI is valid both in the source cell and in the target cell for transmitting packet-switched data between the cellular network and the mobile station. The Handover type may be valid irrespective of there having been assigned a value of the P-TMSI for the target cell. This means that the Handover TLLI may be used before and after a value for the P-TMSI identifier is assigned for the target cell. The Handover TLLI may be alternatively for use in the source cell and in the target cell until a value of the P-TMSI assigned for the target cell is in use in the target cell. Taking a value of the P-TMSI in use in the target cell typically involves the network informing the mobile station about the value of the P-TMSI for the target cell and the mobile station acknowledging this value.

It is thus possible to use the handover TLLI for packet data transfer in the source cell and in the target cell, for example, in the following circumstances relating to the value of the P-TMSI for the target cell. Firstly, the Handover TLLI may be used before a value of P-TMSI is assigned for the target cell. Secondly, the Handover TLLI may be used after a value of P-TMSI has been assigned for the target cell, but the mobile station is not yet aware of the P-TMSI value for the target cell. Thirdly, the Handover TLLI may be used after the mobile station has received information indicated the value of the P-TMSI for the target cell but the mobile station has not yet acknowledged this value.

The use of Handover TLLI provides the advantage that the service interruptions are shorter during the packet-switched handover procedure than in a case, where local and foreign TLLI values are used.

In some embodiments of the invention especially applicable to GPRS/EGPRS systems, the Handover TLLI is computed independently by each of the nodes involved in a packet-switched handover from the source P-TMSI, in other words from the P-TMSI value in use by the MS upon detection of a need for a packet-switched handover. The Handover TLLI, similarly as the other defined TLLI types, consists of 32 bits, numbered from 0 to 31 by order of significance, with bit 0 being the LSB. The Handover TLLI may be defined as shown in Table 15 in FIG. 12. In Table 15, the left-most six columns specify the bits of the TLLI identifier. The column on the right specifies the type of the TLLI identifier.

In Table 15, as discussed in TS 23.003, 'T', 'R', 'A' and 'X' indicate bits that can take any value for the type of TLLI. More precisely, 'T' indicates bits derived from a P-TMSI, 'R' indicates bits chosen randomly, 'A' indicates bits chosen by the SGSN, 'G' indicates bits derived from the assigned G-RNTI and 'X' indicates bits in reserved ranges. 'H' bits, similarly as 'T' bits, indicate bits derived from a P-TMSI.

As mentioned above, the Handover TLLI may be determined independently by an MS and a SGSN that have a valid P-TMSI. The Handover TLLI may be determined as Table 15 in FIG. 12 indicates. In other words, bits 31 down to 30 are set to 0;
bit 29 is set to 1; and
bits 28 down to 0 are set equal to bits 28 to 0 of the P-TMSI assigned for the source cell.

Handover TLLI may be built from the P-TMSI because, as discussed below in detail, the source P-TMSI is known and kept by all the nodes involved in packet-switched handover in the source cell and the target cell.

It is appreciated that the table in FIG. 12 does not represent the only possible way to determine a value for the Handover TLLI. However, this definition is done considering the definition of the local and foreign TLLI, to differentiate handover TLLI from these values.

It is appreciated that in more general terms the P-TMSI and the TLLI are, respectively, a first identifier used for identifying a mobile station and a second identifier used for identifying resources allocated for packet-switched services for the mobile station. The Handover TLLI is, in more general terms, a type for the second identifier for a mobile station entering or having entered a second cell from a first cell, this type of the second identifier being for use in both the first cell and the second cell for transmitting packet-switched data between the cellular network and the mobile station.

Figure 11:
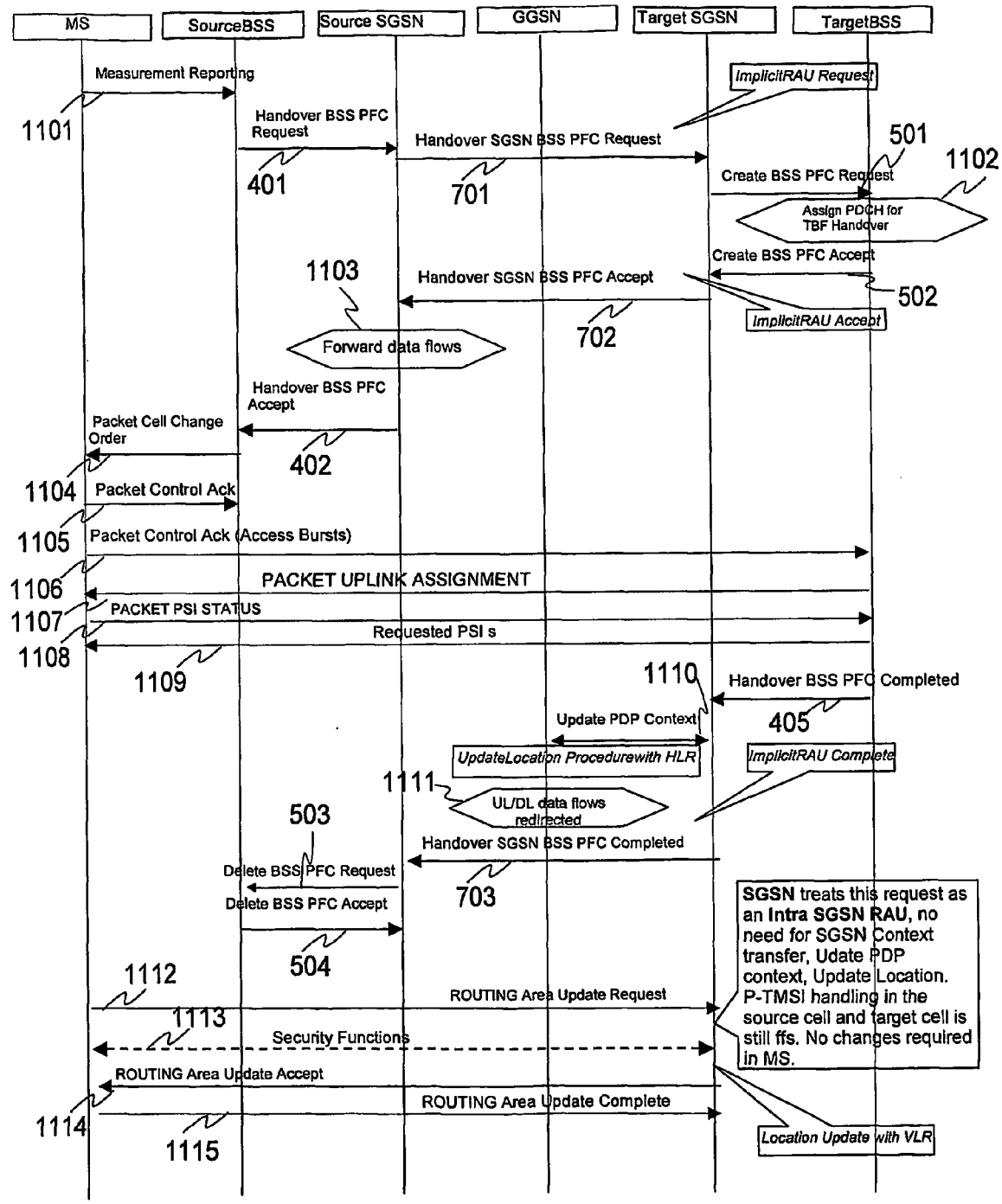
FIG. 11 shows schematically an inter-SGSN packet-switched handover procedure in accordance with an embodiment of the invention.

FIG. 11 shows an inter-SGSN packet-switched handover in accordance with an embodiment of the invention in more detail. The use of the Handover TLLI is discussed in more detail in connection with FIG. 11.

Step 1101 in FIG. 11 represents measurement reporting by the mobile station. The source BSS typically identifies the MS as a packet-switched handover capable and identifies the target cell. Based on information about the target cell, the source BSS sends the Handover BSS PFC Request message 401 to the source SGSN to request BSS PFC handover to the target cell. The source SGSN based on the target cell identifier in the message 401 determines whether the handover is an intra-SGSN or inter-SGSN handover. In the case of Inter-SGSN handover, the SGSN initiates handover of the BSS PFC context of this MS to the Target SGSN by sending the Handover SGSN BSS PFC Request message 701.

The target SGSN identifies the target BSS and if the target SGSN can accept the request, the target SGSN sends a CREATE BSS PFC Request message 501. Before sending the message 501, the target SGSN may assign a P-TMSI for the target cell (new P-TMSI) and determine a Handover TLLI based on the P-TMSI in the source cell (old P-TMSI). The Handover TLLI is used in the message 501, as indicated in Table 12. If Handover TLLI is not used, the TLLI in the message 501 is the local TLLI based on the new P-TMSI.

The target BSS tries to reserve the radio resources, that is, the target BSS assigns timeslots for the TBF handover in step 1102. After successful radio resource reservation the target BSS sends a CREATE BSS PFC Accept message 502 to the target SGSN. The Handover TLLI is advantageously used in the message 502. Alternatively, the same local TLLI is used as in the message 501.

When the Handover TLLI is used, the target BSS may differentiate between the BSS PFC subject to a handover procedure and those BSS PFCs that are not subject to a handover procedure based on the TLLI type in the message 501. For BSS PFCs subject to a handover procedure, the TLLI type in the message 501 is handover. For BSS PFCs not subject to a handover procedure, the TLLI type in the message 501 is local.

The target SGSN upon receipt of the CREATE BSS PFC Accept message 502 sends to the source SGSN the Handover SGSN BSS PFC Accept message 702. The source SGSN derives the Handover TLLI from its P-TMSI, and the source SGSN uses this Handover TLLI value for the signaling messages as well as for data transfer until the completion of the handover. Step 1103 represents that data flows are forwarded to the target SGSN from the source SGSN at this point.

The source SGSN sends the HANDOVER BSS PFC ACCEPT message 402 to the source BSS. The source BSS sends a Packet Cell Change Order (PCCO) message 1104 to the MS. The PCCO message has a <TBF_Handover_Struct> that provides the MS with the necessary information related to TBF handover on the target cell. The MS receives the PCCO message 1104. If the MS is polled by the source BSS, the MS sends a PACKET CONTROL ACKNOWLEDGMENT message 1105 after which the MS may switch to a new cell. The MS upon receipt of the PCCO message 1104 derives the Handover TLLI from its P-TMSI. The MS uses the Handover TLLI value for signaling messages and for uplink data, until the MS receives the new P-TMSI during RAU procedure.

When the MS is in the target cell, it sends a PACKET CONTROL ACKNOWLEDGMENT message 1106 to the target BSS to request the timing advance from the network. The target BSS responds by sending a PACKET UPLINK ASSIGNMENT message 1107 containing a valid timing advance information and TBF assignment for the target cell. Thereafter the MS sends a PACKET PSI Status message 1108 to request the missing system information (P)Sis ((Packet) System Information). The target BSS send the Requested PSIs 1109 to the MS. Thereafter the target BSS sends a HANDOVER BSS PFC COMPLETE message 405 to the target SGSN to indicate that the TBF Handover is completed.

The target SGSN initiates the Update PDP context procedure 1110 with the GGSN as well as the Update Location procedure with the HLR. After these procedures, the uplink and downlink data flows are redirected in step 1111 to be between the target SGSN and the GGSN.

The target SGSN sends a HANDOVER SGSN BSS PFC COMPLETE message 703 to the source SGSN to indicate that the TBF handover to the target cell is completed. The target SGSN initiates the deletion of the BSS PFCs in the source cell by sending the Delete BSS PFC Request message 503. The Handover TLLI may be used in these messages. If the Handover TLLI is not used at all, the local TLLI is used in these messages. The source BSS removes the BSS PFC for this MS and sends a BSS PFC delete accept message 504 to the source SGSN.

The target SGSN and the mobile station carry out an Intra-SGSN Routing Area Procedure. This involves the following messages and functions: a Routing Area Update Request message 1112, security functions 1113, a Routing Area Update Accept message 1114, and a Routing Area Update Complete message 1115.

In the case of TBF handover the target SGSN has already all the MM contexts and PDP contexts for the MS. This is because the messages 701, 702 and 703 are interpreted as implicit RAU messages (see FIG. 11). There is thus no need for an Inter-SGSN RAU procedure.

As a packet-switched handover procedure involves procedures to be performed both in the source cell and in the target cell, it is possible that a failure occurs in the source cell or in the target cell. In the following some failure scenarios are discussed briefly. It is appreciated that the messages defined above are sufficient to deal with many failures.

A packet-switched handover may fail in the source cell mainly due to the lack of resources in the target cell, loss of signaling messages or SGSN Context Transfer Failure. In the Target cell, a packet-switched handover may fail due to the failure of Initial Access at target cell, failure of the Update of PDP Contexts or Update of the Location Area Update. In this case the MS is allowed to go back to the source cell. The MS may also release the TBF and try to make an access at the target cell via (P)CCCH.

A packet-switched handover may fail while the MS is still in the source cell due to the lack of resources in the target cell, either on the air interface or even in the link to the BSS. The target SGSN may determine immediately without initiating any Create BSS PFC procedure that the target SGSN cannot accept the HANDOVER SGSN BSS PFC Request message. In this case the target SGSN will send a HANDOVER SGSN BSS PFC REJECT message back the source SGSN. The cause for this can be that the target SGSN has no resources available on the link to the target BSS.

If the target BSS cannot allocate any resources for the list of PFIs, the target BSS will send a CREAT BSS PFC NACK message to the target SGSN. Target SGSN will inform the source SGSN by means of HANDOVER SGSN BSS PFC FAILURE message. The target SGSN also deletes the MM and PDP context for this MS. The source SGSN informs the source BSS about the resource unavailability by means of HANDOVER BSS PFC REJECT message. In this case the source BSS may order the MS in another NC mode or the source BSS may initiate handover procedure in another cell.

If resources in the target cell have been assigned but the initial access in the target cell fails, the MS may return to the source cell and send a PACKET CELL CHANGE FAILURE message with the appropriate cause. The source BSS and the source SGSN have still the BSS PFCs, MM and PDP contexts for this MS. The source BSS may order the MS in another NC mode or it may initiate the packet-switched handover in another cell. The resources assigned in the target cell need to be released. The source BSS sends a Handover BSS PFC FAILURE message with the appropriate cause to the source SGSN. Upon receipt of this message source SGSN sends the HANDOVER SGSN BSS PFC FAILURE message to the target SGSN to indicate that the packet-switched handover has failed. The target SGSN will also discard any buffered data it has received for this MS, and it will initiate a delete BSS PFC procedure in the target cell.

It is appreciated that a network element for a cell (typically a base station) and a control network element of a cell (for example, a SGSN) may be modified to support embodiments of the invention. Typically, the modifications may be made by updating suitable software relating to the protocol for handling provision of packet-switched services.

It is appreciated that the names of the signaling messages may differ from the names mentioned in the above description. It is furthermore appreciated that the contents of the messages may also differ from the content of the messages described above. The details of the embodiments of the invention are intended to enhance understanding of the invention, not to restrict the invention only to certain messages.

It is appreciated that in the description and in the appended claims the term "packet flow" refers to a sequence of data packets, which are related to each other. A packet flow may, for example, contain data relating to one upper-level data connection or session. Alternatively, a packet flow may carry information relating to more than one connection or session.

It is appreciated that in the appended claims providing packet-switched services for a mobile station refers to any packet data transfer between a mobile station and a cellular network.

It is appreciated that a set of packet data contexts refers to one or more packet data context.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, said method comprising:
providing packet-switched services for a mobile station in a first cell based on a set of information relating to provision of packet-switched services and a protocol for handling provision of packet-switched services for mobile stations, said protocol being a protocol between a cell and a respective control network element,
receiving from the first cell in a control network element relating to the first cell a first message indicating a request for a packet-switched handover for a mobile station, and
sending, in response to said first message, to a second cell a second message requesting creation of a set of information relating to provision of packet-switched services for the mobile station in the second cell, the second message being a message of said protocol for handling provision of packet-switched services for mobile stations.

2. A method as defined in claim 1, wherein packet-switched services are provided for the mobile station by providing at least one packet flow and said first message indicates a set of packet flows relating to the mobile station to be handed over.

3. A method as defined in claim 1, wherein packet-switched services are provided for the mobile station by providing at least one packet flow and said second message indicates a set of packet flows relating to the mobile station to be handed over.

4. A method as defined in claim 1, wherein packet-switched services are provided for the mobile station by providing at least one packet flow, said set of information relating to provision of packet-switched services comprises at least one packet flow context, and said second message is a message requesting creation of at least one packet flow context in the second cell.

5. A method as defined in claim 4, wherein said first message indicates at least one packet flow context relating to the mobile station.

6. A method as defined in claim 4, wherein said second message indicates at least one packet flow context relating to the mobile station.

7. A method as defined in claim 1, wherein said first message is a message of said protocol for handling provision of packet-switched services for mobile stations.

8. A method as defined in claim 1, wherein said second message contains information identifying the first cell and the second cell.

9. A method as defined in claim 1, wherein resources for packet-switched services in a cell are defined as temporary block flows and said second message contains temporary block flow parameters of the mobile station in the first cell.

10. A method as defined in claim 1, wherein the second message contains an identifier for identifying resources allocated in a cell for packet-switched services for the mobile station, the identifier having a value valid in the first cell and in the second cell.

11. A method as defined in claim 1, further comprising receiving from the second cell a third message indicating creation of said set of information relating to provision of packet switched services in the second cell.

12. A method as defined in claim 11, wherein said third message indicates a set of packet flows, said set of packet flows being accepted for the packet-switched handover.

13. A method as defined in claim 1, further comprising sending to the first cell a fourth message, said fourth message indicating acceptance of the packet-switched handover for the mobile station.

14. A method as defined in claim 13, wherein said fourth message indicates a set of packet flows, said set of packet flows being accepted for the packet-switched handover.

15. A method as defined in claim 1, further comprising receiving from the second cell a fifth message, said fifth message indicating completion of the packet-switched handover for the mobile station.

16. A method as defined in claim 15, wherein said fifth message indicates a set of packet flows, said set of packet flows being accepted for the packet-switched handover.

17. A method as defined in claim 1, further comprising sending to the first cell a sixth message for deleting a set of information relating to provision of packet switched services of the mobile station, said sixth being a message of said protocol for handling packet switched services for mobile stations.

18. A method as defined in claim 1, further comprising:
controlling packet-switched services in the first cell by said control network element,
controlling packet-switched services in the second cell by a further control network element, and
sending a seventh message from the control network element to the further control network element, said seventh message indicating a request for a packet-switched handover from the first cell to the second cell,
wherein said further control network element is sending the second message upon receiving the seventh message.

19. A method as defined in claim 18, wherein the seventh message contains sets of information relating to packet data protocols and mobility management.

20. A method as defined in claim 18, further comprising carrying out a procedure relating to transfer of sets of information relating to packet data protocols and mobility management between said control network element and said further control network element.

21. A method as defined in claim 18, further comprising sending an eighth message from said further control network element to said control network element, said eighth message indicating acceptance of the packet-switched handover.

22. A method as defined in claim 21, further comprising sending a ninth message from said further control network element to said control network element upon receipt of a message indicating completion of the handover in the second cell, said ninth message indicating completion of the packet-switched handover.

23. A method as defined in claim 1, wherein said protocol for handling provision of packet-switched services for mobile stations is a Base Station Systems (BSS) General Packet Radio Service (GPRS) protocol.

24. A method as defined in claim 1, wherein packet-switched services are provided for the mobile station by providing at least one packet flow, said set of information relating to provision of packet-switched services comprises at least one base station system packet flow context, and said packet-switched handover is a base station system packet flow context handover.

25. An apparatus being configured
to handle provision of packet-switched services for a mobile station in a cell based on a set of information relating to provision of packet-switched services and a protocol for handling provision of packet-switched services, and
to initiate preparations for a packet-switched handover of the mobile station to said cell upon receipt of a message requesting creation of a set of information relating to provision of packet-switched services for the mobile station, said message being a message of the protocol for handling provision of packet-switched services.

26. An apparatus as defined in claim 25, said apparatus being a base station supporting a General Packet Radio Service or an EDGE General Packet Radio Service.

27. A network element, said network element being configured
to handle provision of packet-switched services for mobile stations in at least a cell using a protocol for handling provision of packet-switched services, and
to send, in response to receipt of a message indicating a request for a packet-switched handover of a mobile station to the cell from a further cell, to the cell a message requesting creation of a set of information relating to provision of packet-switched services for the mobile station in the cell.

28. A network element as defined in claim 27, said network element being a General Packet Radio Service (GPRS) Supporting Node for a cellular network supporting a General Packet Radio Service or an EDGE General Packet Radio Service.

29. An apparatus being configured
to provide packet-switched services for a mobile station based on a set of information relating to provision of packet-switched services and a protocol for handling provision of packet-switched services for mobile stations, said protocol being a protocol between a cell and a respective control network element,
to receive from a first cell in a control network element a first message indicating a request for a packet-switched handover for a mobile station in the first cell, and
to send, in response to said first message, to a second cell a second message requesting creation of a set of information relating to provision of packet-switched services for the mobile station in the second cell, the second message being a message of said protocol for handling provision of packet-switched services for mobile stations.

30. An apparatus as defined in claim 29, said apparatus being a cellular network supporting a General Packet Radio Service or an EDGE General Packet Radio Service.

* * * * *